(12) United States Patent  (10) Patent No.: US 9,225,534 B2
Billingsley et al.  (45) Date of Patent: Dec. 29, 2015

(54) POWER CONDITIONING MANAGEMENT

(75) Inventors: Richard J. Billingsley, Rossland (CA); Robert A. Dawley, Creedmoor, NC (US); Andrew Benton, Blue Bell, PA (US)

(73) Assignee: Electronic Systems Protection, Inc., Knightdale, NC (US)

( * ) Notice: Subject to any disclaimer, the term of this patent is extended or adjusted under 35 U.S.C. 154(b) by 658 days.

(21) Appl. No.: 13/435,788

(22) Filed: Mar. 30, 2012

(65) Prior Publication Data

US 2012/0265361 A1 Oct. 18, 2012

Related U.S. Application Data

(60) Provisional application No. 61/476,231, filed on Apr. 15, 2011.

(51) Int. Cl.
| | |
|---|---|
| *G05F 5/00* | (2006.01) |
| *H04L 12/12* | (2006.01) |
| *H02J 3/14* | (2006.01) |
| *H02J 13/00* | (2006.01) |

(52) U.S. Cl.
CPC . *H04L 12/12* (2013.01); *H02J 3/14* (2013.01); *H02J 13/001* (2013.01); *H02J 13/0079* (2013.01); *H02J 2003/143* (2013.01); *Y02B 60/34* (2013.01); *Y02B 70/3225* (2013.01); *Y02B 70/3266* (2013.01); *Y04S 20/222* (2013.01); *Y04S 20/242* (2013.01)

(58) Field of Classification Search
CPC ....... H02J 13/001; H02J 13/0079; H02J 3/14; H02J 2003/143; H04L 12/12; Y02B 60/34; Y02B 70/3225; Y02B 70/3266; Y04S 20/222; Y04S 20/242

USPC ................................................. 700/286–298
See application file for complete search history.

(56) References Cited

U.S. PATENT DOCUMENTS

| | | | |
|---|---|---|---|
| 4,414,601 | A | 11/1983 | Conroy, Jr. |
| 5,136,455 | A | 8/1992 | Billingsley |
| 5,721,661 | A | 2/1998 | Mechanic |
| 5,956,222 | A | 9/1999 | Wittner et al. |
| 6,040,969 | A | 3/2000 | Winch et al. |
| 6,229,682 | B1 | 5/2001 | Mechanic |
| 6,560,086 | B2 | 5/2003 | Mechanic |
| 6,728,089 | B2 | 4/2004 | Harford |

(Continued)

OTHER PUBLICATIONS

Extended Search Report in counterpart European Application No. 12002622.4, mailed Aug. 16, 2012.

*Primary Examiner* — Kenneth M Lo
*Assistant Examiner* — Derrick Boateng
(74) *Attorney, Agent, or Firm* — Edell, Shapiro & Finnan LLC

(57) ABSTRACT

A power conditioning device includes a set of outlets through which one or more load devices are provided electricity. Each device outlet is controlled independently of the control of other device outlets. The power conditioning device includes a storage device that contains a set of controls by which the power conditioning device can be operated and programmed. The set of controls, which may be contained in a Hypertext Markup Language formatted file and retrieved by a remote device through Hypertext Transfer Protocol requests, allows such control and programming to be performed from a remote location. Additionally, the power conditioning device may be configured to log selected data and provide (such) the log, as well as selected alarms, to the remote device.

19 Claims, 10 Drawing Sheets

(56) References Cited

U.S. PATENT DOCUMENTS

| | | |
|---|---|---|
| 6,744,613 B2 | 6/2004 | McCook et al. |
| 6,947,266 B1 | 9/2005 | Billingsley |
| 6,956,725 B2 | 10/2005 | Boughton, Jr. et al. |
| 7,068,487 B2 | 6/2006 | Harford |
| RE39,446 E | 12/2006 | Winch et al. |
| 7,184,252 B2 | 2/2007 | Harford |
| 7,511,934 B2 | 3/2009 | Benton et al. |
| 7,541,696 B2 | 6/2009 | Dawley |
| 7,551,412 B2 | 6/2009 | Winch |
| 2007/0168088 A1* | 7/2007 | Ewing et al. .................. 700/295 |
| 2008/0019068 A1 | 1/2008 | Reynolds et al. |
| 2010/0019575 A1* | 1/2010 | Verges ............................ 307/38 |
| 2010/0274403 A1* | 10/2010 | Maeda et al. .................. 700/291 |
| 2011/0063759 A1 | 3/2011 | Billingsley et al. |
| 2011/0072289 A1* | 3/2011 | Kato ............................ 713/324 |

\* cited by examiner

POWER CONDITIONING MANAGEMENT

RELATED APPLICATION DATA

This application claims priority under 35 U.S.C. §119(e) to U.S. Provisional Patent Application No. 61/476,231, entitled "Web Enabled Power Conditioning Management System," filed Apr. 15, 2011, the contents of which are hereby incorporated herein by reference in their entirety.

BACKGROUND

Power conditioning devices, or simply power conditioners, are used to improve the quality of electricity provided to equipment connected thereto, such as to ensure a substantially constant sinusoidal alternating current (AC) wave over varying supply conditions. It is to be understood that the term power refers to electrical power provided to and drawn by a load, and to electricity, i.e., voltage and current. The meaning of the term will be clear from the context in which it is used herein.

Electricity provided by a power conditioner may be filtered to remove various noise components and may be limited, clamped or diverted to prevent spikes and voltage surges from entering the protected equipment. Power conditioners may use filter circuits to filter out noise signals from the AC supply voltage and suppressor circuits to suppress transients/surges from the AC supply voltage, thereby limiting these potentially disruptive/damaging conditions from reaching connected equipment. Such power conditioners may have multiple outlets to which the equipment can be connected and through which the conditioned power may be provided. In certain systems, the connected load equipment is treated as a single load, i.e., a voltage surge in the supply power is prevented from entering all connected equipment. However, a heavy draw of power by a single load may interrupt power to loads connected to outputs of the power conditioner. Thus, the requirements of individual load equipment cannot be accommodated by a single power conditioner. While this may present little impediment in certain applications, other applications would require multiple power conditioners to satisfy the requirements of multiple loads, even when these loads are in close proximity to each other. There is thus an apparent need for control over individual outlets and the power drawn therefrom and for means by which such control may be monitored and modified from a central location.

SUMMARY

Instructions are stored on a power conditioning device that, when executed by a processor on a remote device, generates a set of user controls on a user interface thereof. The instructions are retrieved from the power conditioning device and executed on the remote device to generate the user controls. One or more criteria, such as threshold values, are specified through the user controls such that when a process variable, such as voltage, current, temperature, etc., meets the criteria an action is compelled on the power conditioning device. Physical quantities are measured and corresponding values are assigned to the process variables. The action specified through the user controls is performed upon the criterion being met.

The above and still further features and advantages of the present inventive concept will become apparent upon consideration of the following definitions, descriptions and descriptive figures of specific embodiments thereof. While these descriptions go into specific details of certain embodiments of the inventive concept, it is to be understood that variations may and do exist and will be apparent to those skilled in the art upon review of this disclosure.

DETAILED DESCRIPTION

Figure 1:
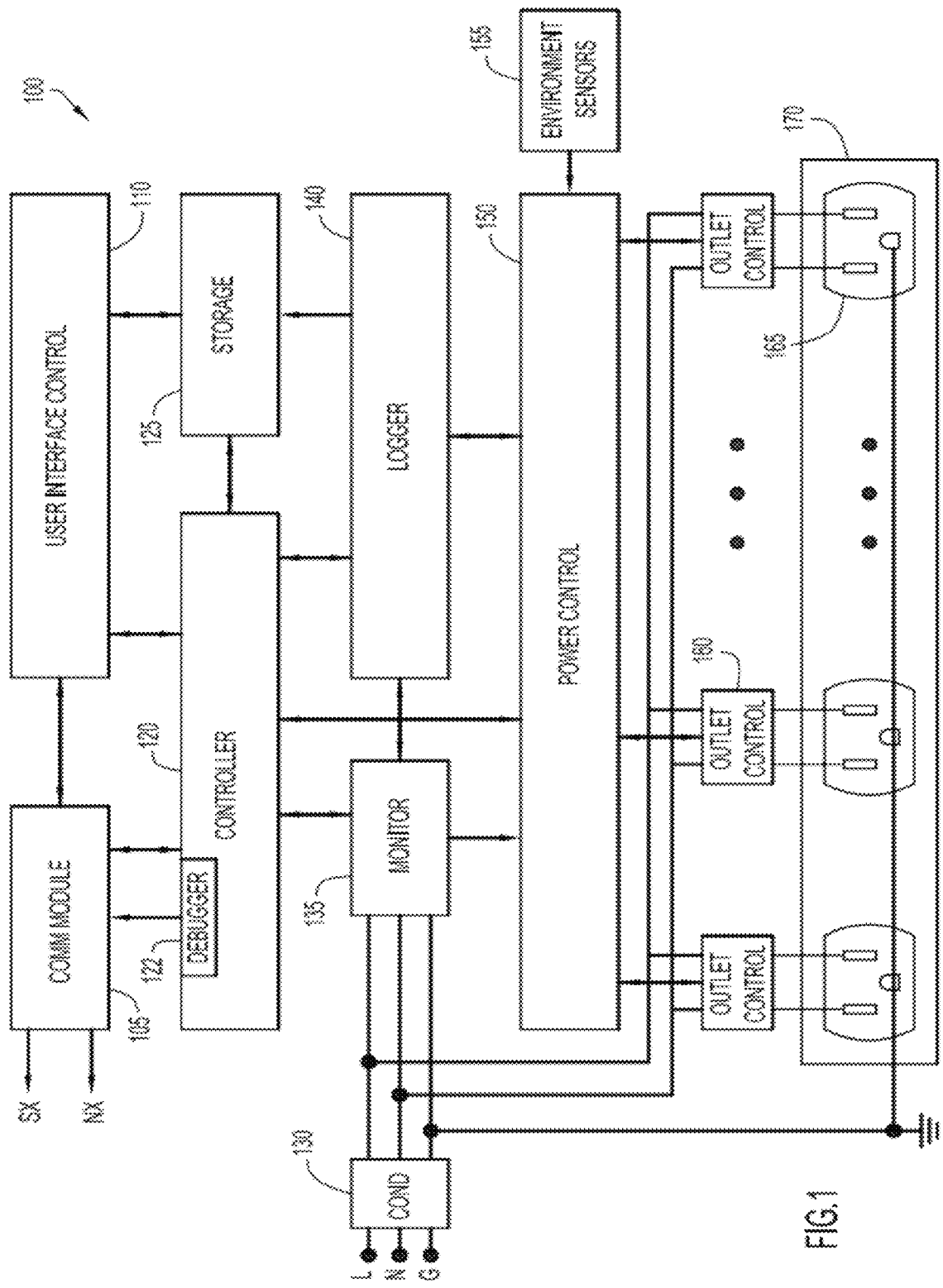
FIG. 1 is a schematic block diagram of a power conditioning system by which the present general inventive concept may be embodied.

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, it is to be understood that the term exemplary, when used herein, is intended to mean, "serving as or providing an example of," or, "a typical instance." Particular quality or fitness of the examples indicated herein as exemplary is neither intended nor should be inferred.

The system described herein is a power conditioning management system that provides the capability to customize, create and monitor individual outlet and power settings on integrated network-addressable power conditioning devices via remote access. Users can create and run sophisticated, custom sequences from a remote device and receive notifications based on user-defined, predetermined conditions and thresholds, including, for example, outlet status, current draw, power consumption, and ambient temperature. Automated power up/down of selected components may be performed per a customized schedule.

As used herein, power conditioning refers to processing of electricity to increase its quality at a load device and to minimize the possibility of damage to both the load device and the power conditioning components due to abnormal characteristics of the electricity. It is to be noted that the terms power and electricity are used herein synonymously, although it is to be understood that such is not strictly the case. Electric power is the rate of transfer of electric energy, whereas electricity is a phenomenon resulting from the presence and flow of electric charge. The ordinarily skilled artisan will readily be capable of determining the proper meaning of the terms "power" and "electricity" from the context in which the terms are used herein.

Referring first to FIG. 1, there is illustrated an exemplary power conditioning system (PCS) 100 that may provide protection and power conditioning to external loads (not illustrated). At the outset, it is to be understood that FIG. 1 is a schematic block diagram illustrating various functional modules for purposes of description and explanation. The diagram is not intended to serve as an electrical schematic and interconnections illustrated are merely to depict various interoperations between functional components and/or processes, and such interconnections are not intended to imply direct electrical connections between such components nor should such be inferred. Moreover, the functionality illustrated and described in FIG. 1 as separate components need not be distributed as shown, and the discrete blocks in the diagram are not intended to depict discrete electrical components.

PCS 100 may be contained in a rackmount enclosure representatively illustrated by panel 170. In one application, PCS 100 is embodied to properly protect audio-visual (AV) equipment from alternating current (AC) supply surges and transients that can disrupt sound quality and digital performance. PCS 100 may include elements that provide common mode and normal mode (impedance tolerant) EMI/RFI filtering, inrush current elimination and catastrophic over/under voltage shutdown.

PCS 100 may be electrically coupled to a power source (not illustrated) at input terminals L, for an AC line conductor, N, for an AC neutral conductor, and G for a ground conductor. PCS 100 may include a plurality of outlets, representatively illustrated at outlet 165, from which electrical loads electrically coupled thereto receive electrical power. The input terminals L, N and G and the outlets 165 may be accessible from the exterior of the enclosure 170. It is to be understood that while PCS 100 is illustrated as a single-phase AC power control system, other input configurations including multiphase AC can be used in conjunction with the present invention without departing from the spirit and intended scope thereof.

Outlets 165 may be independently controlled to, for example, selectively connect and disconnect the connected loads to and from the input power based on a selectively defined threshold. Such control may be in response to system default behavior, such as an AC supply transient/surge in the input power, a level of power consumption in one or more of the connected loads, or due to a user-programmed behavior, as will be described in more detail below. To that end, each outlet 165 may be controlled on an individual, independent basis by an associated outlet controller, representatively illustrated at outlet controller 160. Outlet controller 160 may be operated by a signal from power controller 150 such as, for example, in response to an input transient/surge or a global power scheme. Additionally, outlet controllers 160 may also control outlets 165 to which they are respectively associated. For example, outlet controller 160 may provide monitoring of the corresponding outlet 165 and perform some action based on some outlet condition, such as, for example, disconnecting the load in response to high power consumption.

Power controller 150 may provide system-wide power control in accordance with which power is provided to outlets 165. To that end, power controller 150 may be provided data from sources throughout the system from which control decisions can be made. For example, the input power may be conditioned by a suitable power conditioner 130 and provided to a power monitor 135. Power monitor 135 may, in turn, provide data to power controller 150 indicative of voltage and/or current levels of the input power. Power controller 150 may compare the power levels with decision criteria, the results of such may compel appropriate action to be taken. Additionally, PCS 100 may include one or more environmental sensors 155, such as those that convert temperature, humidity, vibration and the like into electrical signals. Data indicative of such signals may be provided to power controller 150

Additionally, power controller 150 may perform certain actions that have been programmed by a user. For example, PCS 100 may incorporate an Application Programming Interface (API) comprising a set of commands and/or procedures that allow a user to customize the system performance, where such performance can be controlled at the outlet level. The user may utilize the API to construct a command schedule, which, as used herein, is a user program that establishes an action to be taken, such as a change of state in at least one of the outlets, logging an event, and/or issuing alerts or alarms. A command schedule may include one or more program operations that compels an action in response to user-defined thresholds on measured electrical power parameters, environmental state, or simply to define a power-up or power-down sequence at outlets 165. Other possible command schedules may be created as the ordinarily skilled artisan will recognize upon review of this disclosure. The creation and use of command schedules is described in more detail below.

PCS 100 may include a controller 120 that coordinates operations between functional components thereof. For example, controller 120 may pass data and messages between components and make any cross-component format translations as necessary. Additionally, controller 120 may perform numerical computations, process interrupts, implement timers, format data for storage in storage unit 125, retrieve data from storage unit 125 on behalf of other functional components, and perform other such system control functionality. The present invention is not limited to a particular implementation of controller 120; such may be implemented by a wide array of suitable machine and/or process control methodologies without departing from the spirit and intended scope of the present invention.

Controller 120 may execute a debugger 122 which may be used to identify various system problems including those that occur in a particular user programmed command schedule. Additionally, debugger 122 may be utilized to identify proper operation of hardware and/or software of PCS 100. Debugger 122 may be activated and deactivated by a user, such as a technician, in accordance with properly formatted command for such received by controller 120, such as through a user terminal. Debugger 122 may be implemented in a wide array of debugger technologies as will be recognized by the ordinarily skilled artisan upon review of this disclosure.

PCS 100 may include a data logger 140 to record anomaly events that occur during operation thereof. As used herein, an anomaly event is a measured quantity in an electrical power parameter that exceeds the bounds established for the particular electrical power parameter being measured. Such characteristic qualities may include but not limited to input voltage level, input current level, output voltage level, output current level, power consumption, temperature, humidity, etc. Such qualities are referred to herein as process variables, the values of which at selected times are evaluated against respective criteria. The criteria on the process variables, such as numerical bounds thereon, may be established by hard-coded mechanisms in PCS 100 to, for example, protect sensitive connected equipment that would be impaired if such criteria were to be exceeded. Other bounds may be established by a user through, for example, a command schedule. The crossing of these bounds constitutes an anomaly event, as used herein, and data logger 140 tracks such events and stores information regarding these events in a log file in storage unit 125. Periodically or upon command, the log file may be retrieved from storage 125, such as by controller 120, and provided to interested parties through a communication channel controlled by communication module 105. It is to be understood that an anomaly event may compel performance of some action in addition to logging the event, as will be described in more detail below. Additionally, logger 140 is not limited to logging only anomaly events; other data may be tracked and logged by a data logger 140 in accordance with the application in which the present invention is embodied.

Communication module 105 provides mechanisms by which access to PCS 100 may be obtained by an external device. Communication module 105 may include transmitters, receivers, coders, decoders, modulators, demodulators, buffers and other such functional components to implement communications per one or more communications technologies and protocols. Such technologies and protocols may include wireless transmission and media access including radio frequency and optical transmission, wired electromagnetic media access, packet-switched and circuit-switched networks and corresponding data format and transmission protocols, and so on. For purposes of description and not limitation, communication module 105 implements a serial communication interface Sx, such as a Universal Serial Bus (USB) interface and a network interface Nx, such as an Ethernet interface. Through either interface Sx or Nx, one or more corresponding communication channels can be constructed and communication may be carried out over the communication channel.

PCS 100 may include a user interface controller 110 to provide user controls by which a user can establish and modify PCS operation. The present invention is not limited to a particular user interface architecture, although, in certain embodiments, the user interface affords flexible control over PCS 100 operations at an arbitrary point of access. To that end, the user controls may be stored in onboard memory, such as storage unit 125, and retrieved through a communication channel by an external device. Accordingly, such an external device can operate PCS 100 from anywhere provided that a communication channel can be constructed therewith by the device. Such an interface may be achieved by, for example, Hypertext Markup Language (HTML) coded pages of user controls that are retrieved by requests conveyed through Hypertext Transfer Protocol (HTTP). When so embodied, activation of a user control may be associated with a command that is also conveyed through HTTP.

In normal operation, PCS 100 may receive supply power through input terminals L, N and G, which may be filtered and conditioned by conditioner 130. The conditioned supply power may then be monitored through monitor 135, which converts the power level, through a measurement of voltage and/or current, into a representative signal indicative of the level. The representative signal may be provided to power controller 150 and used thereby to make power control decisions against control parameters. Additionally, the representative signal from monitor 135 may be provided to data logger 140 which may store the power levels in storage unit 125 for various reports. Additionally, power controller 150 may receive representative signals from environmental sensors 155 which may also be used to make power control decisions. Such decisions can be made based on power quality criteria that, when met, constitutes an anomaly event in accordance with which power controller 150 may take a corresponding action. For example, if the input voltage crosses a maximum safe voltage threshold level, power controller 150 may cause outlet controllers 160 to transition into a nonconductive state thereby removing unsafe voltage levels from attached loads. As another example, if an outlet controller 160 indicates that the load attached to the corresponding outlet 165 is consuming power beyond an established threshold, outlet controller 160 may transition into a nonconductive state and provide a signal to power controller 150 indicative of such. In yet another example, upon a determination of environmental temperature exceeding some threshold, as measured by environmental sensors 155, power controller 150 may cycle the power at outlets 165, i.e., remove power to certain loads for a predetermined cycle time subsequent to which other loads will have power removed while the previously powered down outlets 165 will be powered up. Such cycling may continue per, for example, a user programmed command schedule for over temperature conditions, until the environmental temperature falls to within established limits. In each of these cases, the occurrence of the anomaly event will compel indication of such to data logger 140, which may record the occurrence of the event, the time of the occurrence, the action taken and other data that may be useful to identify such anomalies as well as to identify possible causes thereof.

It is to be understood that not all anomaly events need compel a power control action; certain control parameters may be set to indicate an anomaly event which need only be logged. For example, a voltage threshold may be established by a user, the crossing of which by the input voltage may be logged solely for diagnostic purposes. This voltage threshold may be set to a voltage level that is below an unsafe overvoltage level and/or above an unsafe undervoltage level where power control action would normally be compelled. Thus, during a diagnostic phase subsequent to, for example, chronic unsafe overvoltage events, logged data indicating a trend towards the unsafe voltage levels, by way of crossing the lower voltage threshold, may be useful to the technician to locate power and/or equipment problems.

The control parameters against which power controller 150 makes control decisions may be established in a command schedule of either a system constant command schedule type and/or a user programmed command schedule type. Creation of a user-programmed command schedule may be achieved by accessing user interface controller 110 through a communication channel constructed through communication module 105. User interface controller 110 may form a user interface on a possibly remote end user device, such as a computer, a cell phone, and the like, on which user controls are provided to make changes to the control parameters and/or process variable criteria. For example, one user control may allow the user to modify the aforementioned unsafe overvoltage threshold from that in a default command schedule, thereby creating a new command schedule. In another example, user controls may be presented on the user interface by which a sequence of power related operations can be established and modified. The present invention is not limited to any set of control parameters, command schedules and user controls by which such parameters and command schedules are established and modified. Many alternative configurations to those illustrated and described herein can be used in conjunction with the present invention without departing from the spirit and intended scope thereof.

Figure 2:
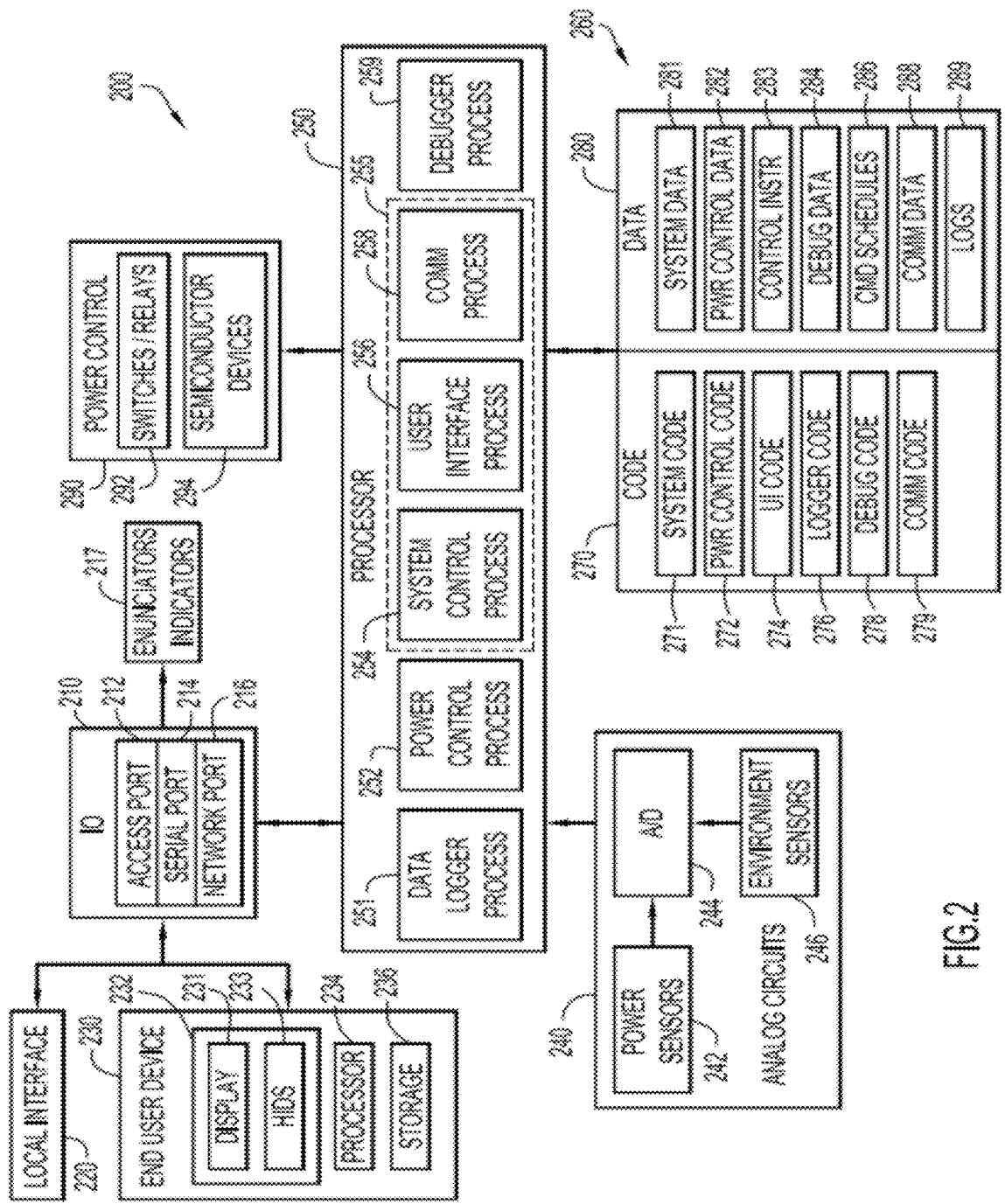
FIG. 2 is a functional block diagram of a power conditioning processing platform by which the present general inventive concept may be embodied.

In FIG. 2, there is illustrated an exemplary processing platform 200 by which operation and control processes described with reference to PCS 100 in FIG. 1 can be carried out. Platform 200 may include a processor 250, such as a microprocessor or microcontroller, a memory subsystem 260 communicatively coupled to processor 250 and an input/output (I/O) subsystem 210 communicatively coupled to processor 250. Additionally, platform 200 may include one or more analog circuits 240 by which controller inputs may be measured. For example, analog circuits 240 may include one or more power sensors 242 that may be used to obtain signal representations of input power, e.g., input voltage and/or input current, and signal representations of outlet power, e.g., outlet voltage and/or outlet (load) current. Such signal representations may be achieved by rectification of the supply AC voltage, for example, to a DC voltage and then converting the resulting DC voltage into a sequence of numerical samples indicative of the DC amplitude through the use of an analog-to-digital converter (A/D), representatively illustrated at A/D converter 244. Analog circuits 240 may also include environmental sensors 246, such as thermocouples, digital thermometers, humidity sensors, accelerometers, acoustic transducers, and the like by which the environment within and surrounding PCS 100 can be monitored. Such transducers produce an electrical signal indicative of the environmental variable for which they are adapted and the electrical signals may be converted into a sequence of numerical samples by another A/D converter 244. The analog circuits 240 produce values for process variables on which proper power control depends. Based on the values for the process variables, the control of power is achieved through power control circuits 290, which may include switches and relays 292 and/or semiconductor switch devices 294 that distribute the received input power among outlets 165.

I/O subsystem 210 may be implemented in hardware and software to implement an interface between external systems and processor 250. Exemplary I/O subsystem 210 includes a network port 216, such as an Ethernet port for communications with a communications network, a serial port 214 through which serial communications can be conducted and a general access port 212 which may be used for connecting specialized equipment, computer peripherals, and the like. For example, access port 212 may be configured to provide signals to enunciators, such as audible buzzers, sirens and the like, and indicators, such as lamps, light emitting diodes (LEDs) and the like, as illustrated at component 217. Such enunciators and indicators may provide visual and audible notification of operations of PCS 100 and of anomaly events detected thereby. The present invention is not limited to specific communication techniques and protocols and the ordinarily skilled artisan will recognize numerous such communication techniques that may be used in conjunction with the present invention without departing from the spirit and intended scope thereof.

I/O subsystem 210 affords communications with a variety of external communication devices. For example, a local interface device 220 may implement a simple terminal through serial port 214, by which, among other things, diagnostic operations can be performed. As another example, an end user device 230 may be communicatively coupled to platform 200 through network port 216. Indeed, end user device 230 may be coupled to network port 216 through a communication channel constructed in a wider network operating under the Transmission Control Protocol/Internet Protocol (TCP/IP) suite. End user device 230 may include a user interface 232 that includes a display 231 and a set of Human Interface Devices (HIDs) 233. Additionally, end-user device 230 may include a processor 234 and storage 236, by which a program may be executed to interact with platform 200 through user interface process 256, as will be described in more detail below.

Memory subsystem 260 may be segmented into a code segment 270 in which to store processor instructions and data segment 280 in which to store variable data. Processor 250 may be configured to execute the processor instructions stored in code segment 270 to thereby carry out various processes implementing the processing control functionality of PCS 100. For example, processor 250 may execute system code 271 to carry out system control process 254, power control code 272 to carry out power control process 252, user interface code 274 to carry out user interface process 256, data logger code 276 to carry out data logger process 251, debugger code 278 to carry out debugger process 259 and communication code 279 to carry out communication process 258.

System control process 254 may implement the functionality of system controller 120 in FIG. 1. System control process 254 may, in addition to those functions described above with regard to controller 120, allocate memory, allocate processor time, coordinating time-sharing among processes executing on processor 250 and other such tasks as required to provide a stable data processing and control platform for purposes of power control. System control process 254 may store the processor state during context switching and the like, as well as other variable data, in data segment 280, as representatively illustrated at system data storage location 281. The ordinarily skilled artisan will recognize numerous system control methodologies that may be used in conjunction with the present invention without departing from the spirit and intended scope thereof.

Data logger process 251 may implement the functionality of data logger 140 in FIG. 1, that is monitoring various inputs and system states that have been selected for logging, formatting data indicative of characteristics of such inputs and system states in accordance with a predetermined data format, and storing the formatted data in memory such as logged data 289 in data memory segment 280.

Communication process 258 cooperates with the communication ports in I/O subsystem 210 to implement the procedures required for carrying out communications over a communication channel via the corresponding port 212, 214 or 216. Communication process 258 may, for example, perform data encoding and decoding, buffer overflow control and the like. Buffers and network stacks may be allocated in data segment 280, representatively illustrated at communication data 288.

In certain embodiments, PCS 100 may include a serial protocol by which terminal communications may be conducted with platform 200. Such a serial protocol may be a command/response protocol whereby a command is issued through serial port 214 and the result of the command is returned as a response. An example command list of an embodiment of a serial protocol is provided below in Table 1.

TABLE 1

| Command | Response |
| --- | --- |
| help | Display the list of commands |
| logIn [name] [password] | Log in with the name and password provided |
| logOut | Logs the user out and closes the connection |
| setDebugLevel | (bitwise) Enables debugging for a level |
| setDebugFeature | (bitwise) Enables feature debugging |
| getState [outlet] | Returns the on/off state of the outlet |
| getLabel [outlet] | Returns the label associated with the outlet |

TABLE 1-continued

| Command | Response |
| --- | --- |
| getCurrent [outlet] | Returns the current draw at the outlet |
| getPower [outlet] | Returns the power usage by the outlet |
| setState [outlet] [on/off] | Sets the state of the outlet |
| setLabel [outlet] [label] | Updates the label associated with the outlet |
| setIP [IpAddress] | Updates the IP address (active on reboot) |
| setSubNet [Mask] | Updates the Subnet Mask (active on reboot) |
| setGateway [IpAddress] | Updates the Gateway (active on reboot) |
| getMac | Returns the MAC address |
| Reboot [timeDelay] | Reboots the network port circuit |

Access to debugger 122 may be obtained through serial port 214. Debugger process 259 may implement the functionality of the debugger 122 by which processor states, process states, power control states, and the like may be tracked and stored as debug data 284 in data segment 280 for system diagnostics. Through the serial protocol commands, a debug level may be selected, examples of which are given below in Table 2.

TABLE 2

| Debug Level | Debug Type | Description |
| --- | --- | --- |
| 0 | Off | No debugging messages. |
| 1 | Critical | Errors that affect the system critically (cease operations or reboot unit) |
| 2 | Error | Issues that could cause a feature to act improperly |
| 4 | Warning | Issues that are not proper but will most likely not inhibit proper operations |
| 8 | Note | References of system events as they occur |
| 16 | Debug | Extremely verbose trace data (Enables 'setDebugFeature' options too) |

Once the debug level has been selected, the features of debugger process 259 may be enabled and/or disabled using a 'setDebugFeature' command. Example features are exemplified in Table 3 below.

TABLE 3

| Debug Feature | Debug Feature Type | Description |
| --- | --- | --- |
| 0 | Off | No specific feature - general settings only |
| 1 | Outlet 1 | Verbose debugging for items related to Outlet 1 |
| 2 | Outlet 2 | Verbose debugging for items related to Outlet 2 |
| 4 | Outlet 3 | Verbose debugging for items related to Outlet 3 |
| 8 | Outlet 4 | Verbose debugging for items related to Outlet 4 |
| 16 | Outlet 5 | Verbose debugging for items related to Outlet 5 |
| 32 | Outlet 6 | Verbose debugging for items related to Outlet 6 |
| 64 | Outlet 7 | Verbose debugging for items related to Outlet 7 |
| 128 | Outlet 8 | Verbose debugging for items related to Outlet 8 |

The types of data that may be tracked by debugger process 259 will vary with the application in which the invention is embodied. The ordinarily skilled artisan will recognize various techniques and data by which a debugger may be implemented in the PCS 100.

Figure 3:
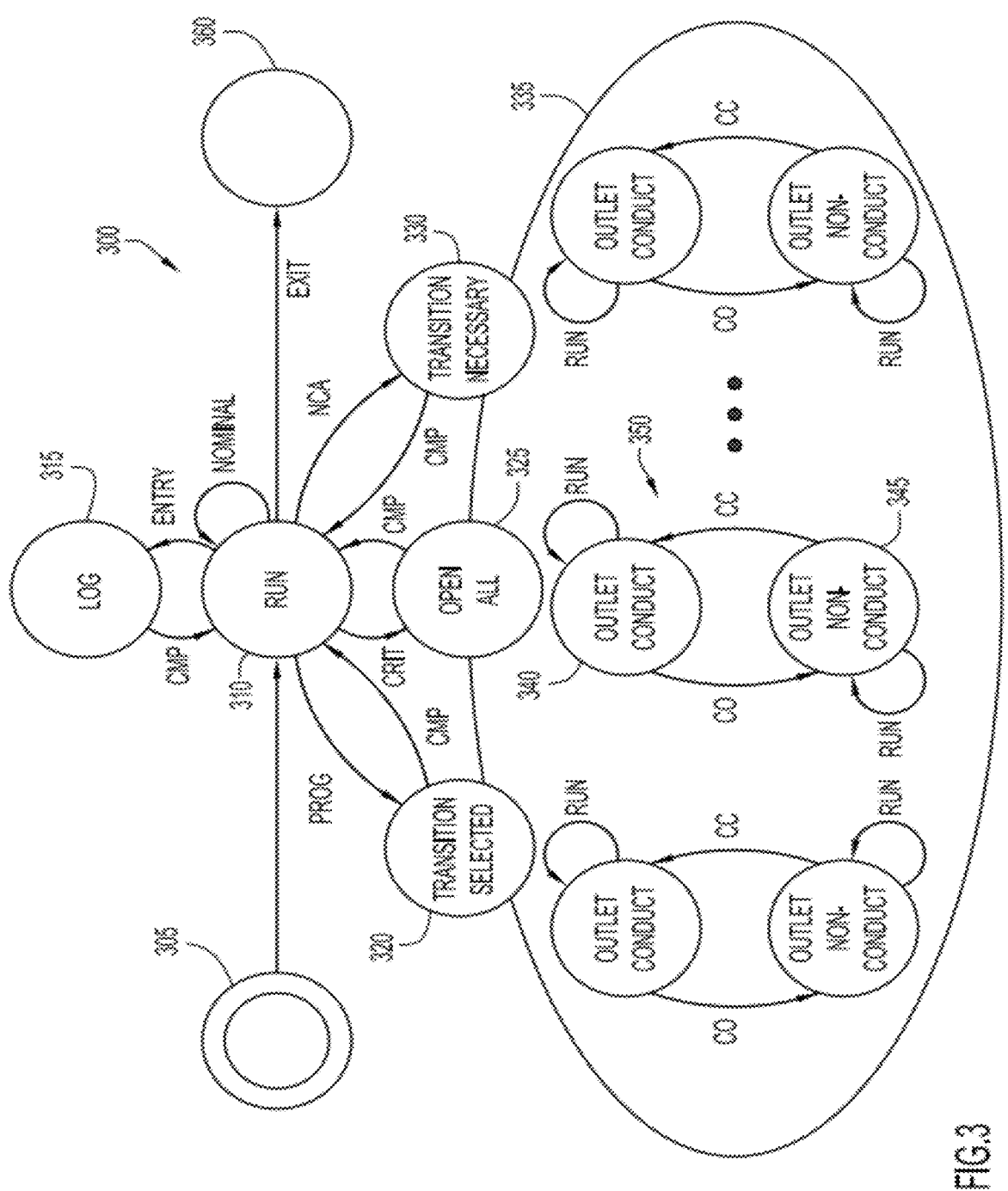
FIG. 3 is a diagram of a state machine by which the present general inventive concept may be embodied.

Power control process 252 may implement the functionality of power controller 150 and outlet controllers 160 in PCS 100. In FIG. 3, there is illustrated an exemplary power control state machine 300 and may be implemented by power control process 252. It is to be understood that state machine 300 depicts a simplified configuration of a possibly much more complex power control system. The exemplary process illustrated in FIG. 3 is provided for purposes of explanation of possible scenarios that may be encountered in an embodiment of the present invention. The ordinarily skilled artisan will appreciate other possible scenarios that may be implemented by way of the present invention upon review and understanding of this disclosure.

In an initial state 305, PCS 100 is initialized with initial values of control parameters that define the state transition boundaries of state machine 300. State machine 300 then transitions into a Run state 310 and remains in Run state 310 as long as all process variables, e.g., voltage, current, temperature, humidity, etc., are within operational bounds thereon established as Nominal for normal operation. State machine 300 may transition out of Run state 310 upon a process event or upon being compelled into a Terminal state 360 upon occurrence of an Exit event, which may occur upon ceasing control operations, such as by removing system operating power from PCS 100. As used herein, a process event occurs when a value of a process variable exceeds a state transition boundary defining the event. Process events may include ENTRY events, Non-critical Anomaly (NCA) events, Critical Anomaly (CA) events, Programmed (PROG) events and Completion events (CMP). The transition boundaries defining these events may be appropriately established based on the severity of the consequences of crossing the boundary. It is to be understood that the present invention is not limited to the foregoing events. Indeed, embodiments of the invention that allow flexible programming of the state transition boundaries afford essentially unlimited number of events and corresponding states.

State machine 300 may include a set 335 of outlet state machines, representatively illustrated at state machine 350, comprising a conductive state 340 and a non-conductive state 345. Each outlet state machine 350 is operable into one of states 340, 345 independently of the state or state transitions of other of the state machines 350. The outlet state machine 350 remains in the state 340, 345 into which it was most recently transitioned while state machine 300 is in Run state 310. Then, depending on the process event that causes state machine 300 to transition out of Run state 310, one or more outlet state machines 350 may receive a Compel Open (CO) event, which compels outlet state machine 350 into Non-conductive state 345, or a Compel Closed (CC) event, which compels outlet state machine 350 into Conductive state 340.

Upon an ENTRY event, state machine 300 may transition into Log state 315, in which certain information, such as the values of the process variables that triggered the ENTRY event, the time of the event, and so on, are stored in log memory location 289 by data logger process 251. Thus, the state transition boundaries for an ENTRY event may be at essentially any level for any process variable. However, to maximize the ratio of useful information to the amount of storage required for logging data, the transition boundaries for an ENTRY event may be established at levels that may indicate potential problems in PCS 100 operation, power source quality, and/or in one or more loads connected to PCS 100. Once the pertinent data has been logged, a CMP event occurs, at which point state machine 300 transitions into Run state 310.

An NCA event may occur upon detection of anomalies that require corrective action, but do not rise to the level of imminent equipment damage or system failure. In response to an NCA event, state machine 300 may transition into Transition Necessary state 330, at which one or more outlet state machines 350 receive a CO event and transition into Non-conductive state 345 as necessary to counteract the anomaly. The number of outlet state machines 350 and which outlet state machines 350 are compelled into the Non-conductive state 345 depend on the circumstances surrounding the occurrence of the NCA event. For example, if the NCA event was caused by power consumption of one of the loads exceeding the transition boundary assigned thereto, the outlet state machine 350 controlling the outlet to which the offending load is connected may transition into the Non-conductive state 345 to the exclusion of any other of the outlet state machines 350. As another example, if the NCA event is caused by environmental temperature exceeding the transition boundary established therefor, certain of the outlet state machines 350 may transition into Non-conductive state 345 in accordance with a predetermined power-down scheme devised for reducing temperature. In certain cases, outlet state machines 350 may alternately cycle between Non-conductive state 345 and Conductive state 340 in counter-cycle with other outlet state machines 350. Once the conditions that caused the NCA event have been cleared, a CMP event may occur, whereby state machine 300 is compelled back into Run state 310. The ordinarily skilled artisan will readily recognize other useful NCA events and power control schemes that can be used to counter-act such events upon review of this disclosure.

In certain applications, state transition boundaries on process variables may be established to trigger a CRIT event, at which time immediate, system-wide action should be taken to prevent system failure or equipment damage. In such an event, state machine 300 may transition into Open All state 325, which compels a CO event in all outlet state machines 350. Such a CRIT event may occur, for example, when an over voltage of sufficient magnitude threatens not only all loads, but PCS 100 as well. Once the offending process variables have returned to Nominal, a CMP event may drive state machine 300 into Run state 310. The ordinarily skilled artisan will recognize other criticalities that can be anticipated by prudent selection of state transition boundaries on the appropriate process variables.

As discussed above, arbitrary power control and system behavior of certain embodiments of the present invention may be achieved by constructing a command schedule. During execution of such a command schedule, a PROG event may compel state machine 300 into Transition Selected state 320. In Transition Selected state 320, outlet state machines 350 selected per the command schedule may be transitioned into either Conductive state 340 or Non-conductive state 345. Once the selected outlet state machines 350 arrive at the selected state, a CMP event may occur and state machine 300 may transition into Run state 310. Certain command schedules may comprise a number of program steps; the first step is executed upon entry into Transition Selected state 320 in response to a PROG event. Upon the subsequent CMP event, Run state 310 is entered followed by a PROG event compelling the next step in the sequence. At each state in the sequence, one or more CO and CC events may be compelled in outlet state machines 350. Accordingly, numerous power-up and power-down procedures can be implemented. Command schedules may be created, as will be described below, and stored in a memory location 286 in data segment 280.

It is to be understood that while the process states are described above with reference to changing outlet states, other system functionality may be modified while state machine 300 is in a state designed for such. Other control procedures may be implemented by embodiments of the present invention without departing from the spirit and intended scope thereof.

Returning once again to FIG. 2, user interface process 256 may implement user interface controller 210. User interface process 256 may provide remote access to memory location 283 through I/O 210. That is, user control instructions in memory location 283 may be retrieved by, for example, end user device 230 through user interface process 256. The user control instructions may be stored in storage unit 236 and executed by processor 234 to generate a user control on UI 232. Through the generated user control, various parameters may be established, set and modified by manipulation thereof through HIDs 233. In certain embodiments, operations of system control process 254, user interface process 256 and communication process 258 may be coordinated to implement a Web server 255 by which user control instructions 283 are retrievable from memory through a properly formatted HTTP request. The user control instructions may include HTML compliant web pages having controls suitably embedded therein. Such embedded controls may be implemented by a suitable processor-executable instruction set, such as HTML form instructions, Perl, Java, Javascript, etc. Through the user controls in UI 232, the end user device 230 may alter power control data 282, such as through another suitably formatted HTTP request. The ordinarily skilled artisan will recognize other techniques by which a remote access device, such as end user device 230, may set power control data 282, including by other application network protocols or dedicated communication sessions through a specialized interface.

Figure 4:
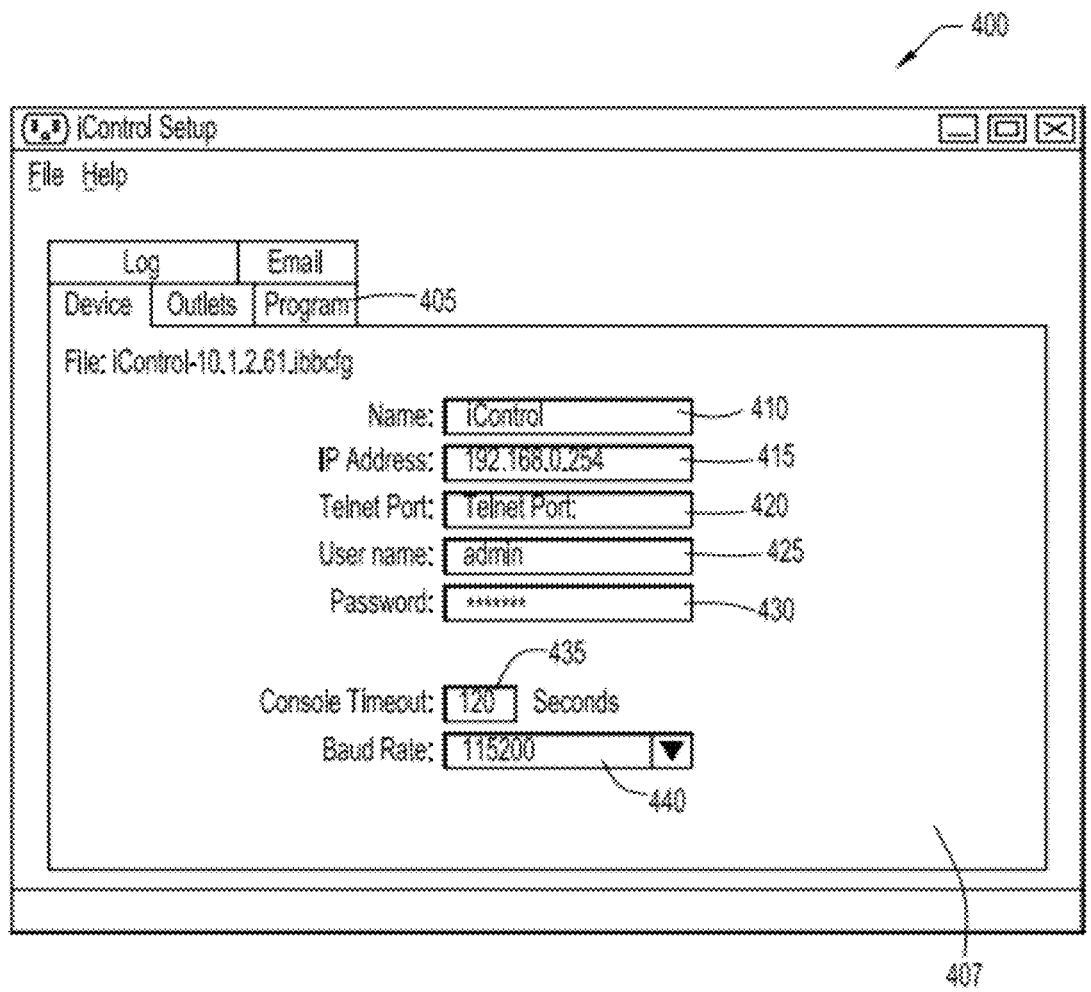
FIG. 4 is an illustration of a set of user controls in the form of a Web page by which a device interface of the present general inventive concept may be embodied.

In FIG. 4, an exemplary web page 400 is illustrated, the instructions for rendering of which may be stored in memory location 283 and retrieved therefrom through Web server 255. The instructions for Web page 400 may be executed by processor 234 to generate the graphical representation thereof illustrated in FIG. 4. Web page 400 includes several graphically-rendered controls that can be manipulated by a user through one or more HIDs 233. Among these controls are tab controls, representatively illustrated at tab 405, textual data entry controls, representatively illustrated at, for example, textual data entry control 410, drop-down selection controls, representatively illustrated at drop-down selection control 440. The ordinarily skilled artisan will recognize a wide-variety of graphical user interface (GUI) controls that can be used in conjunction with the present invention and the present invention is not limited to any particular data entry or data presentation technique.

Figure 5:
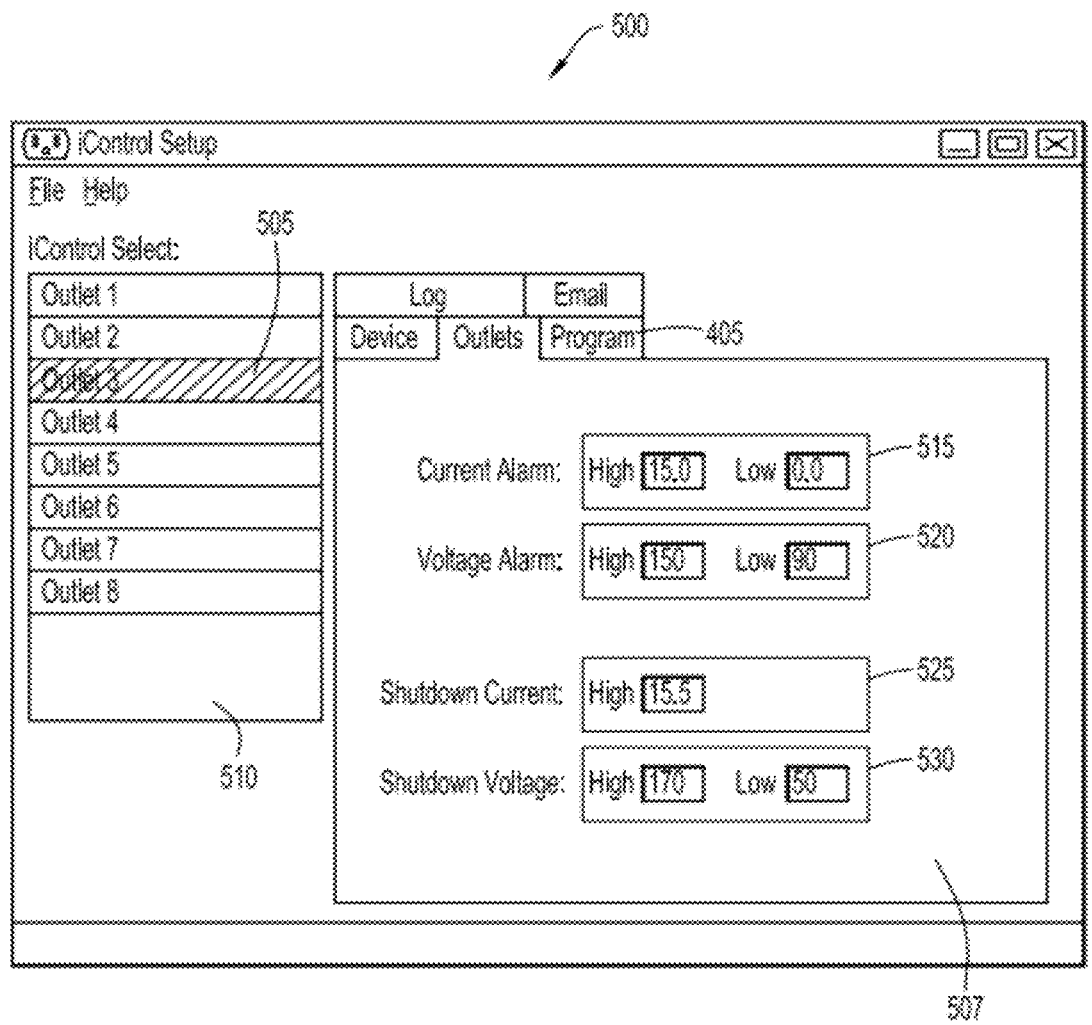
FIG. 5 is an illustration of another set of user controls in the form of a Web page by which an outlets interface of the present general inventive concept may be embodied.
Figure 7:
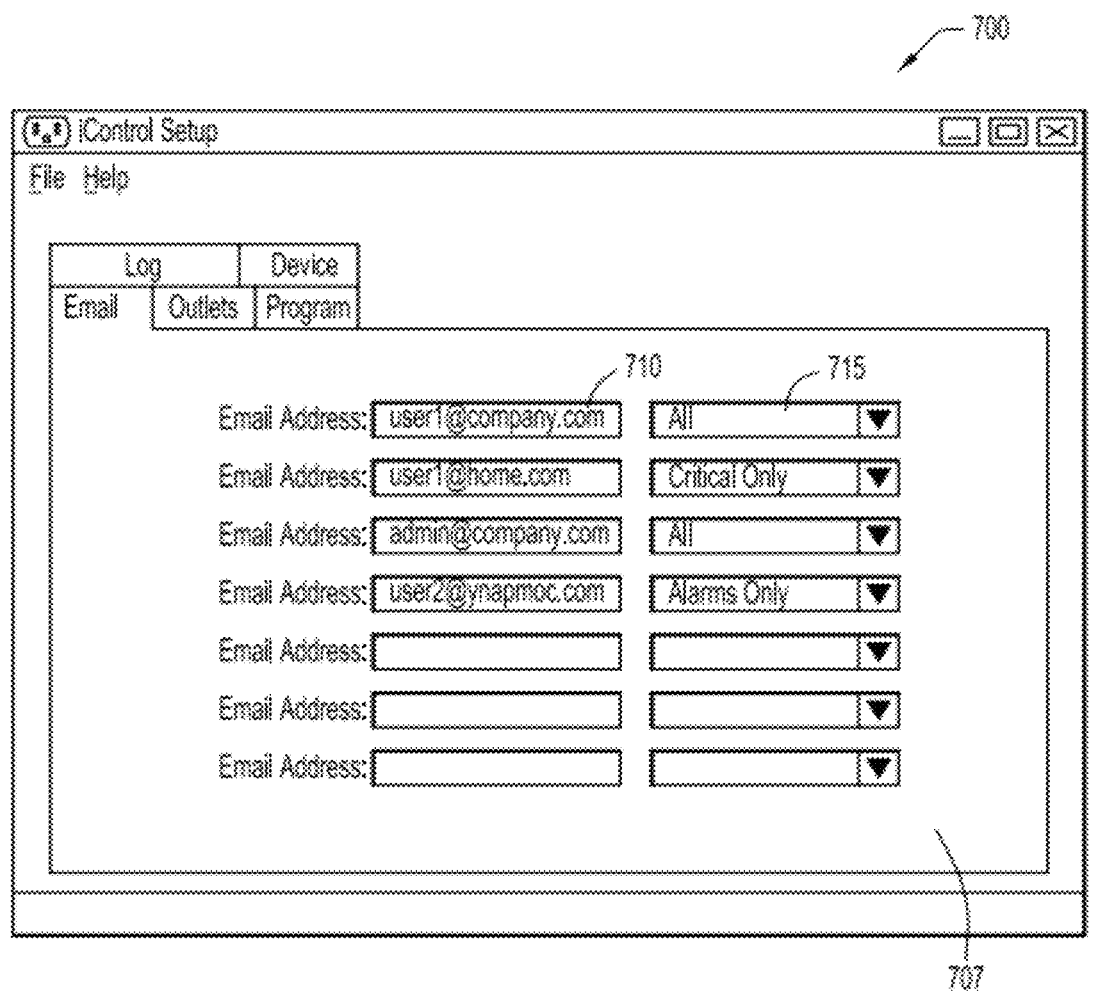
FIG. 7 is an illustration of yet another set of user controls in the form of a Web page by which an email interface of the present general inventive concept may be embodied.
Figure 8:
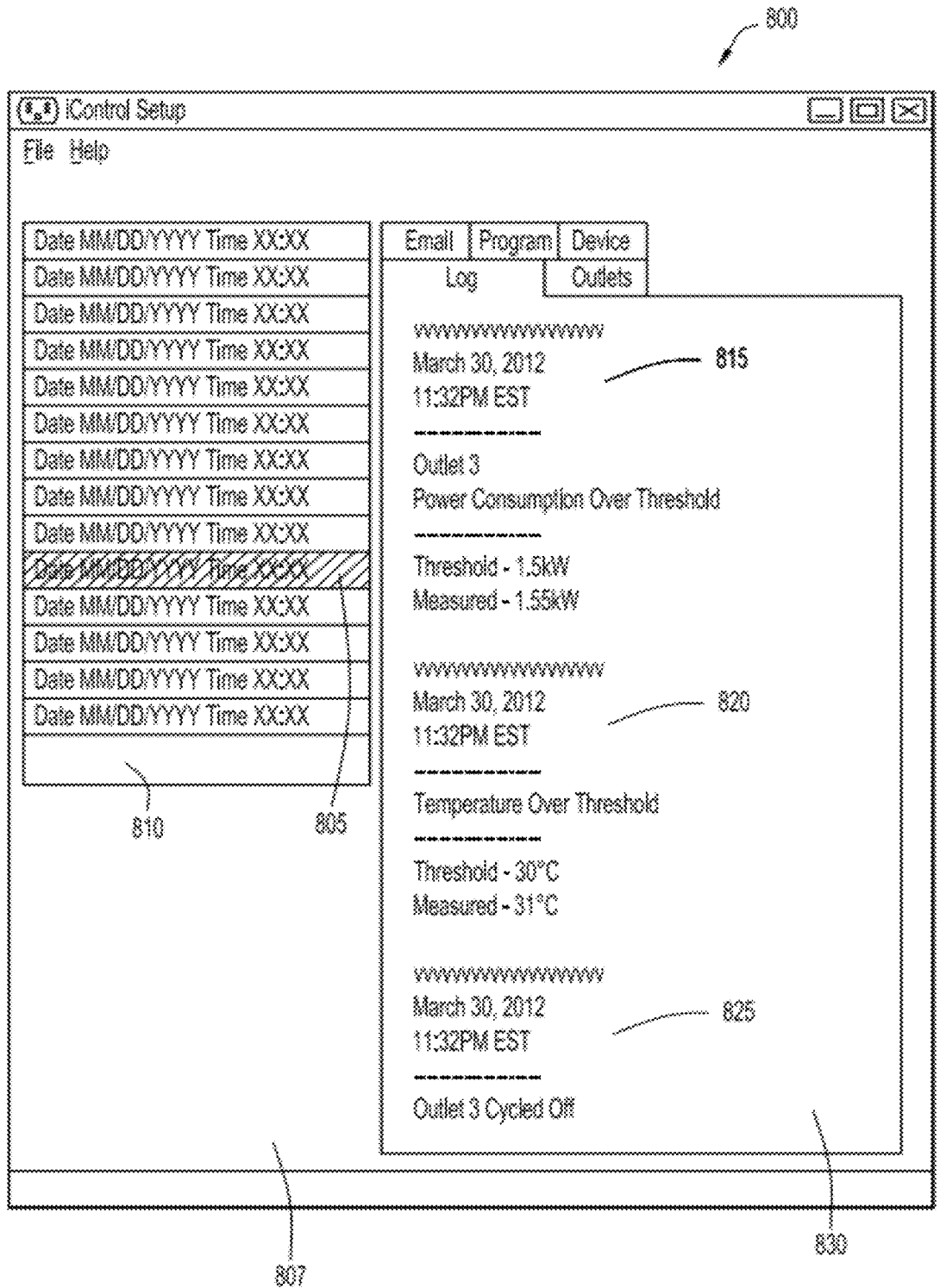
FIG. 8 is an illustration of yet another set of user controls in the form of a Web page by which a data logging interface of the present general inventive concept may be embodied.

Through tab controls 405, a user may select an interface into various functions implemented by PCS 100. In the illustrated example of FIG. 4, such functionality is partitioned into groups: a device interface, illustrated as interface 407, an outlets interface, illustrated in FIG. 5 as interface 507, a programming interface, illustrated in FIG. 6 as interface 607, an email interface, illustrated in FIG. 7 as interface 707 and a log interface, illustrated in FIG. 8 as interface 807. It is to be understood that the interfaces 407-807 are but a few examples of a wide variety of interface controls, and groupings of such controls, that can be implemented in conjunction with the present invention without deviating from the spirit and intended scope thereof. The ordinarily skilled artisan will recognize other interfaces and controls that augment those described and illustrated upon appreciation of the adaptability of the present invention as disclosed herein.

Exemplary device interface 407 includes a data entry field 410 by which PCS 100, as a unit, may be assigned a descriptive name. In data entry field 415, an Internet Protocol (IP) address may be provided for Web server 255. In certain embodiments, the IP address of Web server 415 may be assigned by Dynamic Host Configuration Protocol (DHCP) and in other embodiments, the IP address may be assigned a static value. In data entry field 420, a Telnet port may be identified through which console communications may be carried out with PCS 100. In data entry fields 425 and 430, a user name and password may be provided such that access to Web server 255 is denied without these proper credentials. In certain embodiments, multiple authorized users may be identified, each with a unique username and password. In such embodiments, a separate interface may be created through which such user information can be entered. In data entry fields 435 and 440, console serial communications may be configured such as for local interface 220. The console interface may be used for both debugging and command line operations of PCS 100, where the command line interface implements functionality similar to that described herein with reference to Web page interfaces.

Web page 500 implements the outlet interface 507, by which control parameters may be established for individual outlets 165 through, for example, outlet controllers 160. The control for each outlet may be selected by, for example, a selection control 510 and for the selected outlet, as illustrated by the outlet selection 505 of outlet 3, various data entry controls may be presented. For example, data entry fields 515 may provide means by which bounds on an amount of load current flowing through the selected outlet are established outside of which an alarm may be issued. Similarly, data entry fields 520 may provide means by which bounds on a voltage at the selected outlet are established outside of which an alarm may be issued. In data entry field 525, an amount of load current may be entered above which power is disconnected from the specified outlet and thus from connected load equipment. In data entry fields 530, bounds on the outlet voltage may be set outside of which power is disconnected from the specified outlet and thus from connected load equipment. It should be appreciated that the data entered in fields 515, 520, 525 and 530 may be used to establish transition boundaries in state machine 300 or outlet state machines 350.

In certain embodiments, the processes of PCS 100 illustrated and described with reference to FIG. 2 may be accessible through an API through which specific single- and multi-step operations may be programmed. For example, programmed operation of PCS 100 may include steps that, among others, get or set selected outlet states, obtain measured values for process variables, e.g., voltage, current, power, temperature, etc., power cycle one or more outlets, and so on. Certain embodiments further allow conditional logic to be constructed within a command schedule created through PCS programming. When so embodied, a user can construct special purpose command schedules that can be executed upon user demand or as a part of a response to some predetermined condition. For example, circumstances of an application may require that equipment be powered down (or up) in a prescribed manner, such as when one piece of equipment connected to PCS 100 relies on the state of another piece of equipment connected thereto for proper shutdown. The present invention is not limited to particular API functionality, which may extend beyond that provided as examples below.

Web page 600 implements an exemplary programming interface 607 by which various single and multistep operations may be programmed. In the illustrated example, panel 610 displays the steps that have been programmed as well as the step 605 that is currently being programmed. A programmer may add a step through user control 613, delete a step through user control 615 or clear an entire command schedule through user control 617. Once a command schedule has been completed, it can be saved by activation of a suitable file save control, representatively illustrated at save control 619. A previously programmed command schedule may be retrieved by activation of a suitable file system access control, representatively illustrated at file access control 620. Once retrieved, the steps in a command schedule may be modified, added to and deleted via the programming controls 650, such as through the exemplary operations described in the paragraphs that follow. Programmed command schedules may be stored in memory location 286 in FIG. 2, individual ones thereof may be retrieved and executed by power control process 252 via a suitable file retrieval control, such as file retrieval control 645.

With each step, a set of programming controls 650 may be presented through which the API functionality implemented thereby can be accessed to establish the step. In certain embodiments, a set of outlet controls 630 may be presented by which the separate outlets can be independently controlled in each step. For example, outlet controls 630 may include a connectivity state control 631 by which the load connectivity at the corresponding outlet can be modified, a selection control 633 by which the corresponding outlet can be selected for programming in the current program step 605, and conditional logic controls 635, 637 by which the state of the corresponding outlet is affected by an action entered in THEN field 637 based on the evaluation results of a statement entered in the IF field 635. Connectivity state control 631 may be embodied so that the connectivity state of the previous step is initially indicated. To change the connectivity state in the current step, a user may activate selection control 633 to indicate that the selected outlet is affected by operations of the current step and the connectivity state control 631 may be toggled, such as by suitably activating the control, into the new state. Once all operations that are to occur during the current step 605 have been established through programming controls 650, the programmer may activate Apply control 640, whereby the step is established in the command schedule. The programmer may continue adding steps as necessary to complete the desired programmed functionality.

Figure 6:
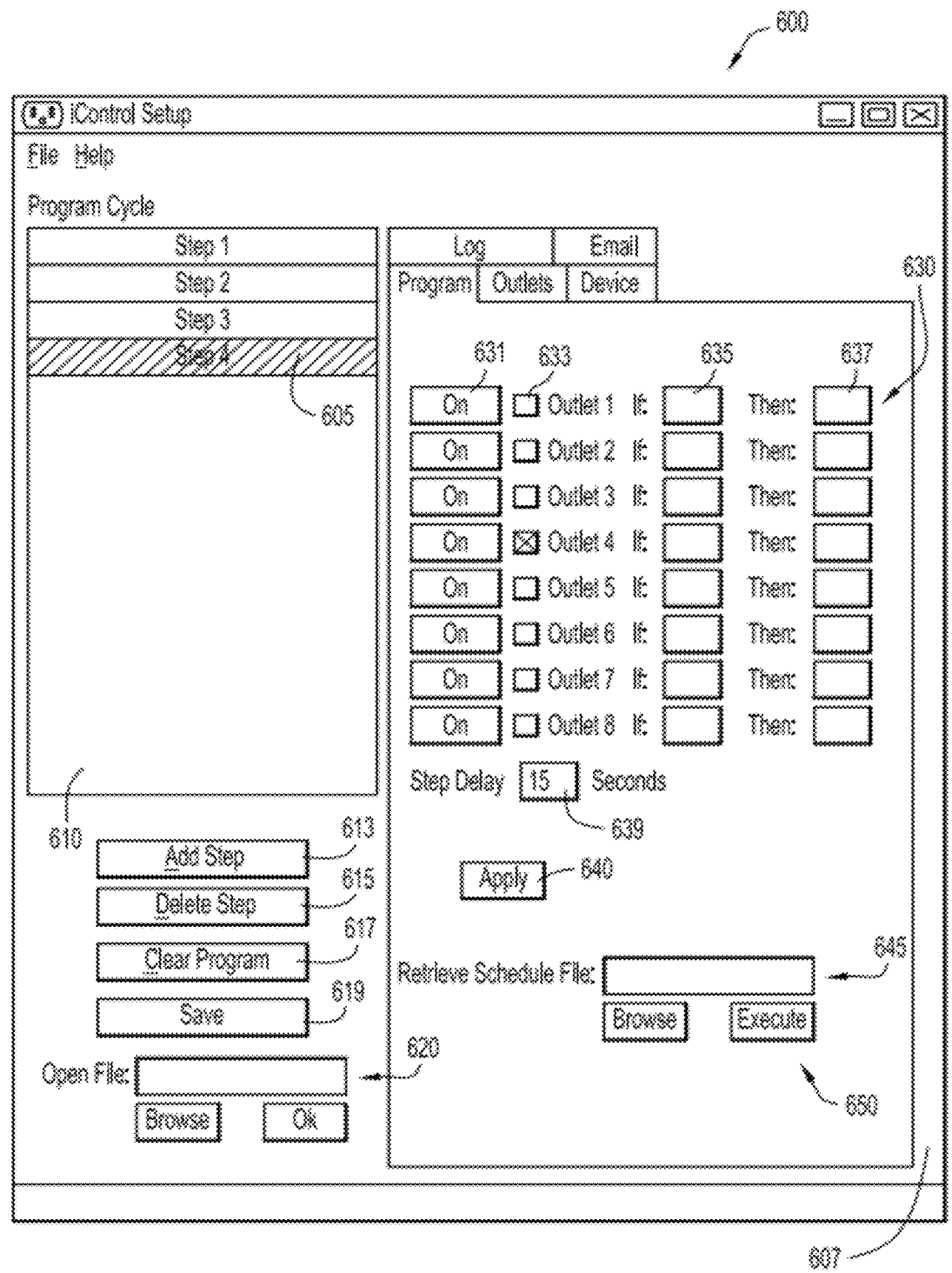
FIG. 6 is an illustration of yet another set of user controls in the form of a Web page by which a programming interface of the present general inventive concept may be embodied.

In certain embodiments, conditional logic may be programmed into one or more steps of a particular command schedule. As illustrated in the example of FIG. 6, the conditional logic may be implemented by IF-THEN statements through conditional logic controls 635, 637 where IF field 635 contains a binary statement and THEN field 637 contains an action that can be executed by PCS 100. In certain embodiments, the IF and THEN controls 635, 637 are implemented through drop-down selection controls in which all possible entries for each field are displayed in a manner by which the programmer can select the appropriate entry. The present invention is not limited to the form and extent of the conditional logic; certain embodiments may allow only simple expressions in IF field 635, whereas other embodiments may allow complex, nested logic therein. As one example, a programmer may enter the expression "IF: kW>1.5, THEN: Alarm," whereby the power drawn by the load connected to the corresponding outlet selected by outlet selection control 633 would be measured and an alarm would be issued if the power is greater than 1.5 kW. The foregoing example assumes that the label "kW" identifies the process variable corresponding to outlet power. As another example, the programmer may enter, "IF: (Temp>32) AND (Curr>15), THEN: (Off AND Alarm)," in which case both the ambient temperature (assuming "Temp" is the label for such) must be greater than 32° C. and the current through the selected outlet (assuming "Curr" is the label for such) must be greater than 15 A in order for the expression to evaluate to TRUE. Upon such positive determination, the selected outlet is transitioned to the Off state (assuming "Off" is the label for such action) and an alarm is issued. The number and format of the labels for process variables accessible for the conditional logic and the labels for the available actions for the conditional logic will vary with the application for which the present invention is embodied. The present invention is not limited by such implementation details.

As illustrated in FIG. 6, an inter-step delay may be introduced through user control 639. When a value is entered into the Step Delay data entry field, a delay equal to the amount of time entered must lapse before the following step will be executed. Other such inter-step functions may be implemented with the present invention without departing from the spirit and intended scope thereof.

Web page 700 implements an exemplary email interface 707 by which interested parties can be informed as to the status of PCS 100. Email interface 707 may include a plurality of data entry controls 710 by which recipient email addresses may be entered. In certain embodiments, each email address is associated with a content level control 715 by which the type of messages sent to the recipient is selected. For example, one recipient may wish to receive all content, which may vary by application, but may include alarms, log entry events, timed events, unexpected operations, etc. On the other hand, another recipient may wish to be notified only if critical events occur, such as when the system has shut down to remove power from all connected loads. The present invention is not limited to granularity of content control or to a particular email message format. The message need only convey enough information so that the recipient can identify the condition for which the email was sent.

Web page 800 implements an exemplary log interface 807 by which logged data may be reviewed. Log interface 807 may include an event selection control 810 by which a time and date of a logged event may be selected, as illustrated at selected event 805. Upon selection of the time and date, panel 830 may then display data pertinent to the particular event. In the illustrated example of FIG. 8, a sequence of events occurred at 11:32 PM EST on Mar. 30, 2012. First, a power consumption threshold was crossed at outlet 3, as indicated at event field 815. Also, the temperature in and/or around PCS 100 was over a threshold value, as indicated at event field 820. Outlet 3 was then cycled off, as indicated at event field 825. Each event field 815, 820, 825 may contain pertinent data, such as measured and threshold values of process variables at the time the data were logged. The present invention is not limited to the content or format of data logs; entries may be made on system or programmed events, or be made on a periodic basis regardless of the system state.

Figure 9A:
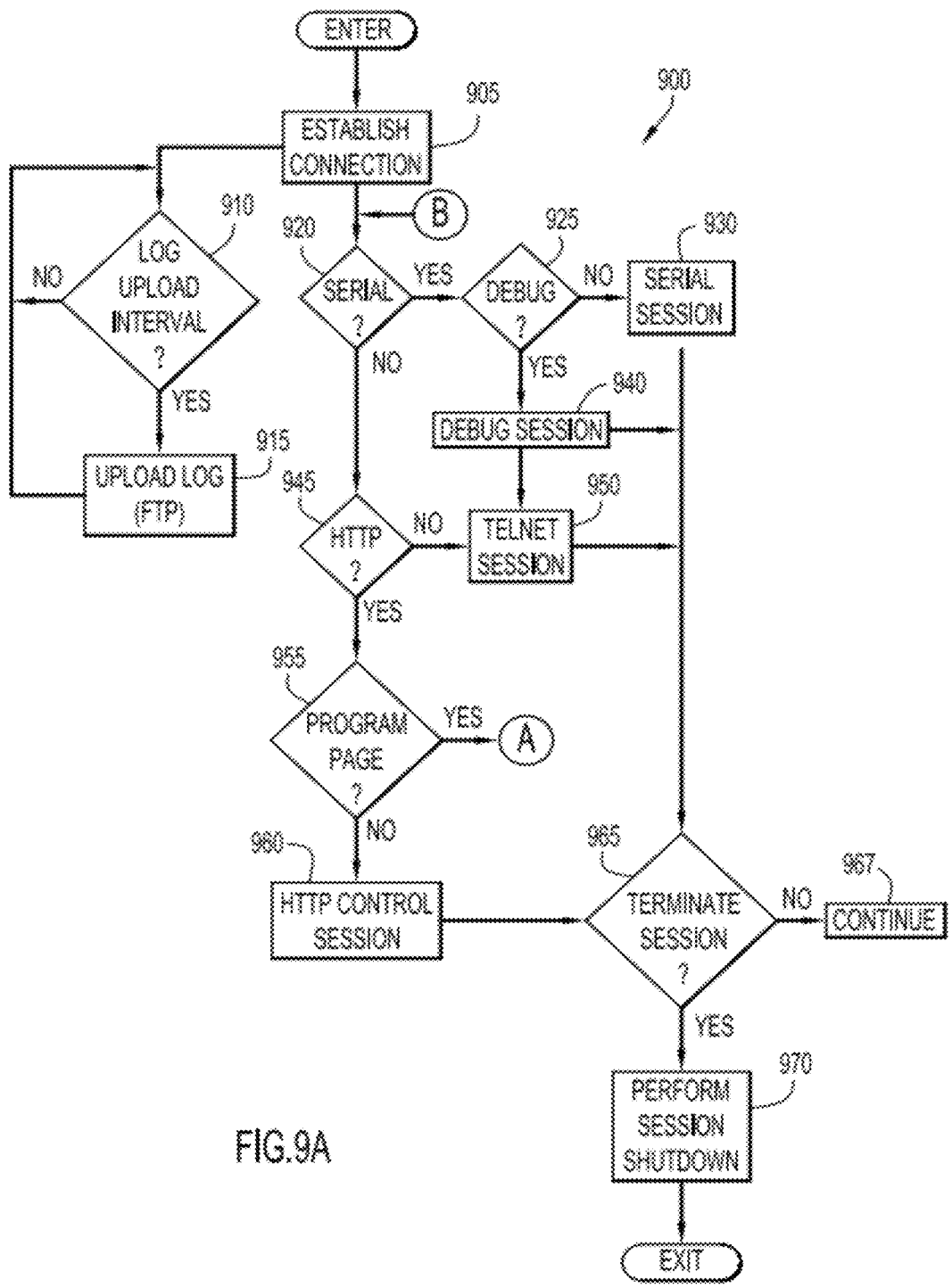
FIGS. 9A-9B depict a flow diagram of a process by which user interaction with an embodiment of the present general inventive concept may be carried out.
Figure 9B:
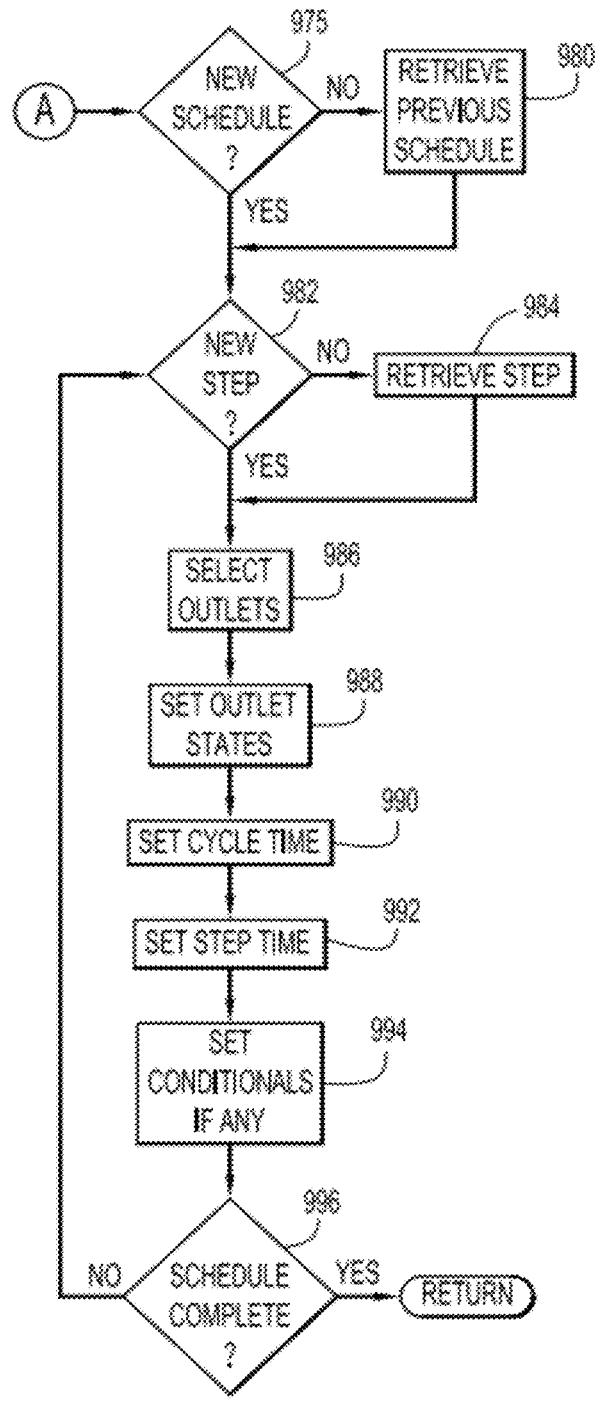

FIGS. 9A-9B depict an exemplary session 900 by which a user may access functionality of PCS 100 for status updates, control, and the like. In operation 905, a connection may be established between local interface 220 or end user device 230 and PCS 100. In the case of a terminal serving as local interface 220, the connection may be established, for example, via a serial interface through serial port 214 or through a Telnet connection through network port 216. End user device may make an application layer connection through network port 216, such as to provide a suitable connection for HTTP. In certain embodiments, PCS 100 may initiate the connection with an external terminal. For example, as illustrated in operations 910 and 915, a data log may be uploaded to a designated location through a suitable connection and transfer protocol, such as the File Transfer Protocol (FTP) at predetermined intervals.

In operation 920, it is determined whether the established connection is through serial port 214. If so, operation 925 determines whether a debug session has been initiated, such as through a command line command. If so, the debug session is afforded in operation 940. If the serial connection is not for a debug session, as determined in operation 925, a serial session is afforded, whereby, for example, the API of PCS 100 is accessed via a command line interface.

If, in operation 920, it is determined that the connection is other than a serial port connection, it is determined in operation 945 whether the Web server is being accessed by an HTTP request. If not, process 900 may proceed to operation 950, whereby a session of some other network transfer protocol is afforded, such as a Telnet session. If, on the other hand, the Web server is being accessed, it may be determined in operation 955 whether a request for the program interface page 600 has been received. If not, process 900 may transition to operation 960, whereby a user control session may be afforded through HTTP in operation 960. In such a user control session, various Web pages, such as those discussed above, may be retrieved and various system functions may be initiated, modified, terminated, etc., thereby. In one such operation, a command schedule may be executed, such as by the command schedule execution controls described above.

If it is determined in operation 955 that the programming page has been retrieved, process 900 may transition to operation 975 in FIG. 9B, whereby it is determined whether a new command schedule is being programmed. If not, a previously programmed command schedule may be retrieved in operation 980. In operation 982, it is determined whether a new step is being added to the command schedule. If not, a previous step may be selected in operation 984, such as through step selection control 610. In operations 986-994, various API functions may be selected and added to the step, as discussed above. It may then be determined in operation 996 whether the step has been fully configured, such as by detection of the activation of Apply control 640. If no, the programming may continue at operation 982, where it is determined whether a new step is desired.

Returning to FIG. 9A, it may be determined in operation 965 whether the session established in operation 905 is to be terminated. If so, the connection may be terminated in accordance with the specifications of the corresponding connection. The connection will continue to be in effect, as illustrated in operation 967, as long as the session is not terminated.

Having described preferred embodiments of new and improved power conditioning management techniques, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus comprising:
   a plurality of output ports to provide output electrical power thereat in accordance with respective outlet states thereof, the outlet states including a conducting state and a complementary non-conducting state;
   a storage unit configured to store:
   a plurality of process variables and values assigned thereto;
   criteria associated with the process variables to define a plurality of process events, each of the process events occurring in response to the values of the process variables meeting the associated criteria;

a command schedule containing program statements in a prescribed execution order in which the program statements are to be sequentially executed, the program statements including at least one of the criteria against which at least one of the process variables is evaluated; and instructions that, when executed by an external processor, generate at least one user control thereat by which user data are accepted from a user, the user data including the criteria on the associated process variables, the program statements and the execution order of the program statements in the command schedule;

a controller configured to sequentially execute each of the program statements in the execution order defined in the command schedule and to compel selected output ports into a programmed one of the conducting and non-conducting outlet states in response to the process events and in response to the values of the process variables meeting the associated criteria defined in the program statements of the command schedule; and a communication module to provide the user control instructions to a communication channel and to receive the user data provided through the user control from the communication channel.

2. The apparatus of claim 1, wherein the user control accepts at least one of the criteria from which at least one of the process events is defined that compels an action by the controller other than that by which the outlet states of the output ports are compelled into respective complementary states.

3. The apparatus of claim 2, wherein the storage unit is further configured to store:

a log including entries identifying occurrences of the process events that compel the action other than that by which the outlet states of the output ports are compelled into respective complementary states, the log being retrievable from the memory through the communication channel.

4. The apparatus of claim 2, wherein the user control accepts specification of the action.

5. The apparatus of claim 1, wherein the program statements include logical conditional statements entered through the user control.

6. The apparatus of claim 1, further comprising:

a processor to execute a debugging process by which operations carried out by the controller are formatted for viewing by the user.

7. An apparatus comprising:

a power conditioner to provide output electrical power at output ports thereof from input electrical power provided at an input port thereof in accordance with respective outlet states thereof, the outlet states including a conducting state and a complementary non-conducting state, the power conditioner comprising:

a memory configured to store:

a plurality of process variables and values assigned thereto;

criteria associated with the process variables to define a plurality of process events, each of the process events occurring in response to the values of the process variables meeting the associated criteria; and a command schedule containing program statements in a prescribed execution order in which the program statements are to be sequentially executed, the program statements including at least one of the criteria against which at least one of the process variables is evaluated; and a controller configured to sequentially execute each of the program statements in the execution order defined in the command schedule and to compel selected output ports into a programmed one of the conducting and non-conducting outlet states in response to the process events and in response to the values of the process variables meeting the associated criteria defined in the program statements of the command schedule;

a storage unit having stored therein instructions that when executed by a processor generate a set of user controls configured to accept user data from a user, the user data including the criteria on the associated process variables data, the program statements and the execution order of the program statements in the command schedule; and a communication module to provide the user control instructions to a remote processor over a communication network and to receive the user data through the user controls generated from the instructions executed on the remote processor.

8. The apparatus of claim 7, wherein the controller in the power conditioner includes a state machine configured to transition between a plurality of states thereof that include the outlet states, the state machine being compelled to transition between the states thereof in response to process events and in response to the values of the process variables meeting the associated criteria defined in the program statements of the command schedule.

9. The apparatus of claim 7, wherein the user controls include a control by which the program statements in the command schedule are ordered in the execution order selected by the user.

10. The apparatus of claim 7 further comprising:

a server communicatively coupled to the communication module, wherein the server has stored therein the instructions for the user controls.

11. The apparatus of claim 10, wherein the server is assigned an Internet Protocol address, the instructions are retrieved from the server over the communication channel in accordance with Hypertext Transfer Protocol, and the user data is received from the remote processor in accordance with the Hypertext Transfer Protocol.

12. The apparatus of claim 7, wherein the user controls generated at the remote processor include a control by which a criterion on one or more of the process variables is specified that defines a process event that compels an action other than that by which the outlet states are compelled into respective complementary states.

13. The apparatus of claim 12, wherein the control for the criterion allows entry of an email address such that the action sends an electronic message to the email address.

14. The apparatus of claim 13, wherein the control for the criterion allows activation of an alarm such that the action sends an electronic issuing of an alarm.

15. A method comprising: storing instructions on a power conditioning device that when executed by a processor on a remote device generates a set of user controls on a user interface thereof; retrieving the instructions from the power conditioning device and executing the retrieved instructions on the processor of the remote device; entering criteria on process variables through the user controls generated on the remote device to define a plurality of process events, each of the process events occurring in response to values assigned to the process variables meeting the associated criteria;

constructing a command schedule through the user controls generated on the remote device containing the program statements in a prescribed execution order in which the program statements are to be sequentially executed, the program statements including at least one of the criteria against which at least one of the process variables is evaluated; wherein the user controls accepts from the user the execution order of the program statements and sequentially executing each of the program statements in the execution order defined in the command schedule on the power conditioning device and compelling selected output ports into a programmed one of the conducting and non-conducting outlet states in response to the process events and in response to the values of the process variables meeting the associated criteria defined in the program statements of the command schedule.

16. The method of claim 15 further comprising:
specifying through the user controls on the remote device a criterion on one or more of the process variables that defines a process event that compels an action other than that by which power is controlled by the power conditioning device.

17. The method of claim 16, wherein entering the criterion includes:
entering a plurality of criteria through the user controls generated on the remote device; and specifying the action includes:
specifying a plurality of actions to be performed upon the process variable meeting the respective criteria.

18. The apparatus of claim 1 further comprising:
an input port through which input electrical power is accepted, the output power being derived from the input power; and
at least one voltage sensor to provide a signal indicative of input voltage at the input port for an input voltage process variable included in the process variables,
wherein the criteria include a critical overvoltage criterion and the process events include a critical event occurring in response to a value of the input voltage process variable meeting the critical overvoltage criterion, the controller being further configured to compel all output ports into non-conducting outlet states in response to the critical event.

19. The apparatus of claim 7 further comprising:
at least one voltage sensor in the power conditioner to provide a signal indicative of input voltage at the input port for an input voltage process variable included in the process variables,
wherein the criteria include a critical overvoltage criterion and the process events include a critical event occurring in response to a value of the input voltage process variable meeting the critical overvoltage criterion, the controller being further configured to compel all output ports into non-conducting outlet states in response to the critical event.

* * * * *